United States Patent
Preisser

[19]

[11] Patent Number: 6,131,881
[45] Date of Patent: Oct. 17, 2000

[54] DEVICE FOR INTERCONNECTING HYDRAULIC OR PNEUMATIC COMPONENTS, ESPECIALLY ELECTROMAGNETICALLY ACTUATED VALVES

[75] Inventor: Wolfgang Preisser, Hilden, Germany

[73] Assignee: A & K Muller GmbH & Co. KG, Germany

[21] Appl. No.: 09/366,967

[22] Filed: Aug. 4, 1999

[51] Int. Cl.[7] .................................................. F16K 51/00
[52] U.S. Cl. .......................................... 251/148; 251/904
[58] Field of Search ..................................... 251/148, 143, 251/904, 149.9, 142; 137/614.06; 285/27, 87, 88, 89, 82

[56] References Cited

U.S. PATENT DOCUMENTS

| | | | |
|---|---|---|---|
| 2,268,407 | 12/1941 | Krone et al. ............................... | 285/88 |
| 4,449,737 | 5/1984 | Specht ....................................... | 285/87 |
| 4,602,654 | 7/1986 | Stehling et al. .......................... | 251/148 |
| 5,295,507 | 3/1994 | Bandy et al. ...................... | 137/614.06 |
| 5,301,985 | 4/1994 | Terzini ....................................... | 285/87 |
| 5,857,713 | 1/1999 | Horimoto .................................. | 285/87 |
| 5,904,302 | 5/1999 | Brown ..................................... | 251/143 |

FOREIGN PATENT DOCUMENTS

0 715 112   6/1996   European Pat. Off. ........ F16L 41/03

Primary Examiner—Kevin Shaver
Assistant Examiner—Eric Keasel
Attorney, Agent, or Firm—Chadbourne & Parke LLP

[57] ABSTRACT

A device for interconnecting hydraulic or pneumatic components, especially electromagnetically actuated valves, each valve having on its outer surface the male or female half of a snap-together connector. The male half is provided with a radial stop that extends into the female half and is secured there by at least one mechanism that locks into place behind it. A locking ring is accommodated in and rotates around the central axis of the female half of the device and is provided with radially inward-projecting locking segments rotated by an outward-extending lever around a prescribed angle out of an assembly position and into a locking position. Stops on the male half in the form of several radially outward-projecting locking cams are distributed at prescribed angles and separated by gaps at least as wide along the circumference as the locking segments. The gaps between the locking segments are at least as wide along the circumference as the locking cams. The male half is inserted into the female half at angles established along the circumference by guides, subsequent to which the locking segments penetrate between the locking cams far enough to come to rest when fully inserted behind the path traveled by the locking segments, which engage them from behind when the ring is rotated out of the assembly position and into the locking position.

8 Claims, 7 Drawing Sheets

DEVICE FOR INTERCONNECTING
HYDRAULIC OR PNEUMATIC
COMPONENTS, ESPECIALLY
ELECTROMAGNETICALLY ACTUATED
VALVES

BACKGROUND OF THE INVENTION

The present invention concerns a device for interconnecting hydraulic or pneumatic components, especially electromagnetically actuated valves, each valve having on its outer surface the male or female half of a snap-together connector, the male half being provided with a radial stop that extends into the female half and is secured there by at least one mechanism that locks into place behind it.

Interconnecting several hydraulic or pneumatic components, especially electromagnetically actuated valves, in series or parallel to create a block or bank is known. It is often necessary for the overall connection to function in all three directions. Such a system is described in European Patent 0 715 112 A2 and French Patent 1 579 506 for example.

Interconnecting such components with threaded connections, bolts, clamps, or clips is known. Patent 0 715 112 A2 for instance describes a method whereby locking mechanisms on the male half of a snap-together connector act in conjunction with counterparts on clips that can be mounted on the female half.

Threaded connectors are mainly one-directional or rotate around a single axis. Connections established with threaded caps lack this limitation but the caps prevent them from being positioned at all close together. Bolts must be dimensioned to the length of the final product, and the connection can be disestablished only by removing the bolts. Connectors that employ clamps or clips cam usually be interconnected only along one direction. A drawback common to all these approaches is the need for separate parts.

SUMMARY OF THE INVENTION

The object of the present invention is a device for interconnecting hydraulic or pneumatic components, especially electromagnetically actuated valves, each valve having on its outer surface the male or female half of a snap-together connector, the male half being provided with a radial stop that extends into the female half and is secured there by at least one mechanism that locks into place behind it that can in particular be employed in connectors comprising several components, especially extending in all three directions. The components can be interconnected rapidly without having to rotate them one against the other and with no need for separate parts that can get lost. There need be no empty space between the components. Finally, individual components can be removed without having to dismantle the connector as a whole.

This object is attained in accordance with the present invention by a locking ring accommodated in and rotating around the central axis of the female half of the device and provided with radially inward-projecting locking segments rotated by an outward-extending lever around a prescribed angle out of an assembly position and into a locking position and by stops on the male half in the form of several radially outward-projecting locking cams distributed at prescribed angles and separated by gaps at least as wide along the circumference as the locking segments, the gaps between the locking segments being at least as wide along the circumference as the locking cams, whereby the male half is inserted into the female half at angles established along the circumference by guides, subsequent to which the locking segments penetrate between the locking cams far enough to come to rest when fully inserted behind the path traveled by the locking segments, which engage them from behind when the ring is rotated out of the assembly position and into the locking position. Advantageous further embodiments of the present invention will be specified hereinafter.

The basic concept of the present invention is to provide locking mechanisms that operate in conjunction, one fixed to the male half and the other permanently attached to the female half. The two halves can be fastened together and separated just by pivoting a lever that extends out of the female half. The lever can be pivoted in two directions by hand or with a small tool, allowing assembly even in complicated situations.

In one especially advantageous embodiment that will be specified by way of example hereinafter, the locking ring can be rotated into three different positions with the lever. In the assembly position, the components will be interconnected to ensure that the locking mechanisms snap into place automatically and, by rotating the ring out of the assembly position and into a release position against the resilience afforded by the material, they can be separated again. The components can finally be locked into place by rotating the ring out of the assembly position and into the locking position, wherein they are firmly fastened together. To separate the components, the ring must be rotated back out of the locking position and into the assembly position and then against the resilience afforded by the material into the release position. One particular advantage of this embodiment is that the connection can be established with only one hand but disestablished only with two hands and accordingly not accidentally.

One embodiment of the device in accordance with the present invention will now be specified along with an assembled series of components by way of example and with reference to the accompanying drawing, wherein

DETAILED DESCRIPTION OF THE INVENTION

FIGS. 1 through 16 illustrate two components, hydraulic for example, K1 and K2. Component K1 is a hose connection and component K2, only the connector of which is illustrated, an electromagnetically actuated valve for instance. The two components are interconnected together by a snap-together connector. Component K1 comprises a male half ST and component K2 a female half BU.

The figures illustrate the two components during various stages of assembly and disassembly. FIGS. 1 through 4 show male half ST and female half BU during an initial phase just before being fastened together. FIGS. 5 through 8 show the two components during a subsequent phase just after a locking mechanism to be specified hereinafter has been snapped together. FIGS. 9 to 12 show the components connected and interlocked to ensure the connection. FIGS. 13 through 16 show the components being separated during disassembly.

The device for interconnecting components K1 and K2 includes a locking ring 3 accommodated in female half BU and rotating around its central axis. Extending radially into the ring 3 in the illustrated embodiment are four locking segments 3.1, each diametrically opposite another, of a prescribed circumferential width, and with gaps 3.2 between them. Extending radially out of male half ST are four locking cams 1.1. Cams 1.1 are separated at a prescribed angle by gaps 1.2. Gaps 1.2 are at least as wide as the locking segments 3.1 in female half BU. The gaps 3.2 in ring 3 on the other hand are wide enough along its circumference to allow locking cams 1.1 to extend through them when male half ST is inserted into female half BU with ring 3 rotated to a specific angle.

As will be evident from the figures, the overall design ensures that, when male half ST is inserted into female half BU while rotated to an angle established by guides, locking segments 3.1 will penetrate between locking cams 1.1 to an extent ensuring that the fully inserted cams (FIG. 6) will come to rest along the direction M of insertion immediately behind the path traveled by the locking segments and that, when ring 3 is rotated out of its assembly position (FIGS. 5–8) and into its locking position (FIGS. 9–12), will be engaged by them on the other side, providing a solid joint between the two components. A gasket 7 on the outer end of male half ST will ensure tightness.

To ensure reliable positioning in precisely established angles of rotation around the circumference while male half ST is being inserted into female half BU, guides in the form of radially inward extending ribs 4.1 are provided in female half BU immediately behind the path traveled by locking segments 3.1 and along the inner circumference. Ribs 4.1 are separated by gaps 4.2 that accommodate locking cams 1.1. The ribs engage as they enter the gaps 1.2 between locking cams 1.1 and accordingly establish the allowed angle of rotation. Depending on the number of locking cams 1.1, there can be four positions of rotation separated by 90°.

Embodiments wherein the number of locking cams 1.1, locking segments 3.1 and gaps 3.2, and ribs 4.1 and gaps 4.2 is a whole multiple of four are of course also possible.

Furthermore, to ensure a tight seat at the particular angle of rotation, radially inward extending ribs 5 are distributed along the inner circumference of female half BU directly in front of the path traveled by locking segments 3.1. Ribs 5 engage, once male half ST has been inserted, gaps between additional guide cams 6 on male half ST. Guide cams 6 are in axial alignment with locking cams 1.1. Between locking cams 1.1 and guide cams 6 is a gap along the circumference that, once male half ST has been inserted, constitutes space along the circumference to accommodate the path of locking segments 3.1 along ring 3.

Figure 1:
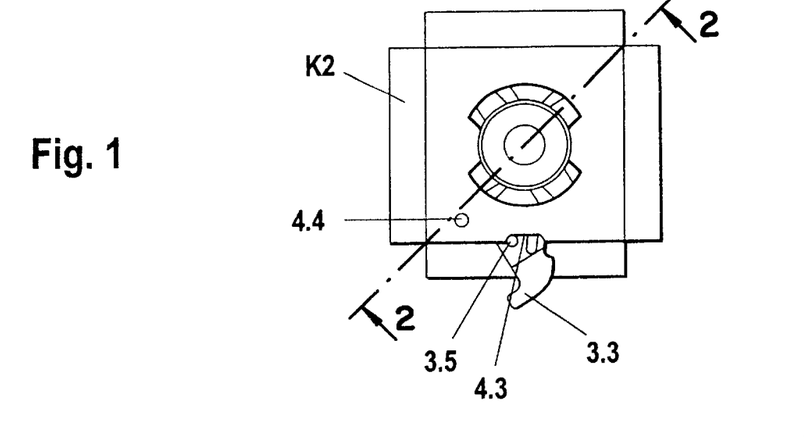
FIG. 1 is an axial view in part of two halves of a fitting that are to be fastened together.
Figure 2:
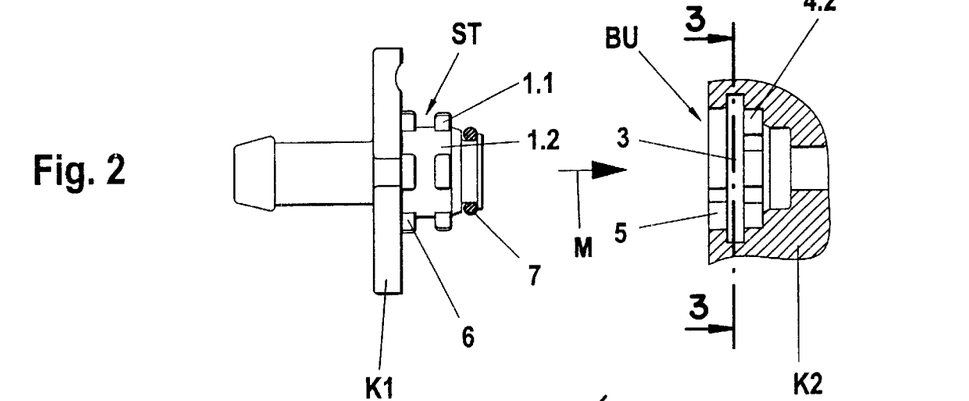
FIG. 2 is a side view of the two components in partial section along the line 2—2 in FIG. 1.
Figure 3:
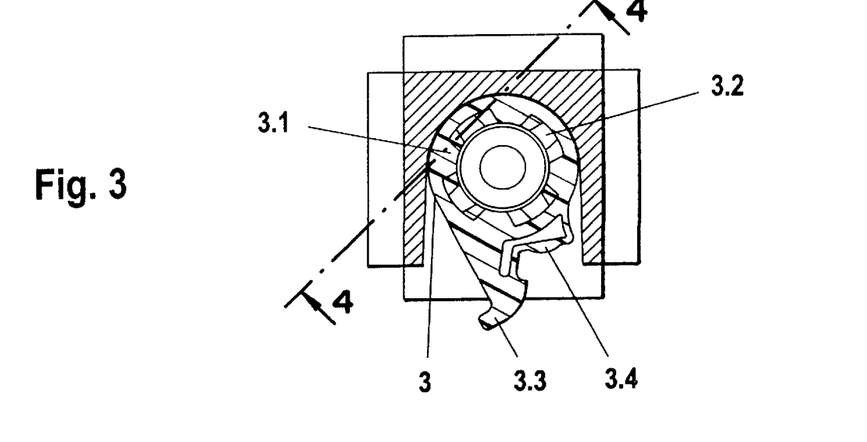
FIG. 3 is a section along the line 3—3 in FIG. 2.
Figure 4:
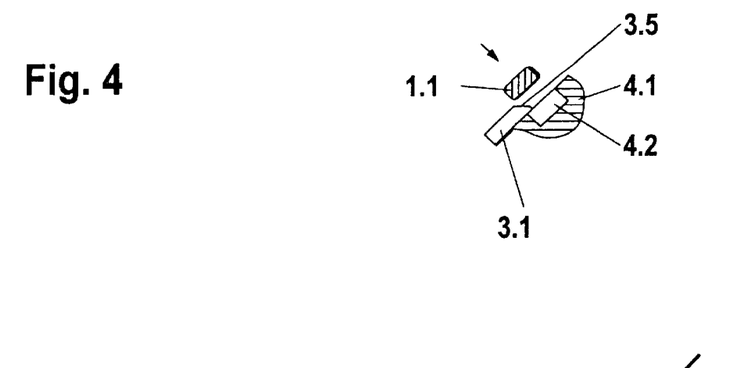
FIG. 4 is a section along the line 4—4 in FIG. 3.
Figure 5:
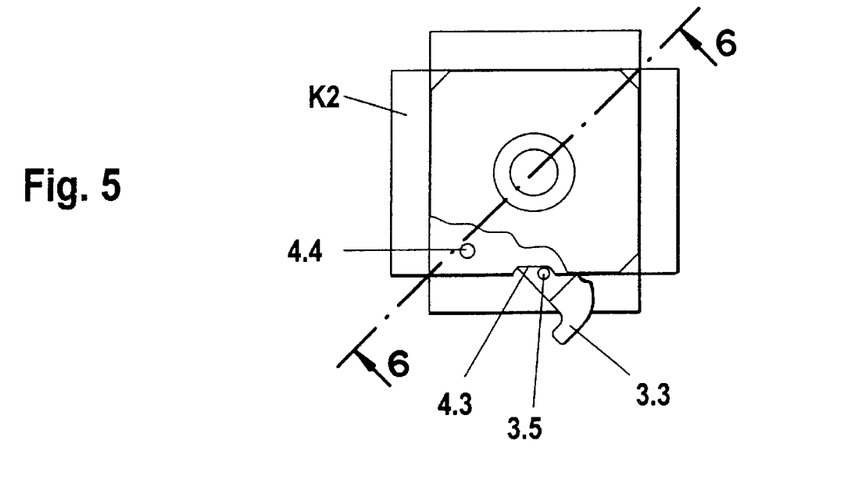
FIG. 5 is a view similar to that in FIG. 1 of the components assembled and snapped together.
Figure 6:
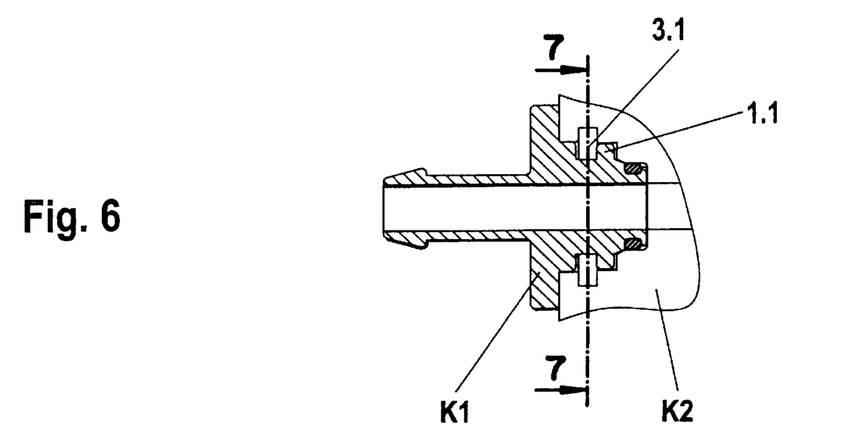
FIG. 6 is a view similar to that in FIG. 2 of the components in the state illustrated in FIG. 5 and is a partial section along line 6—6.
Figure 7:
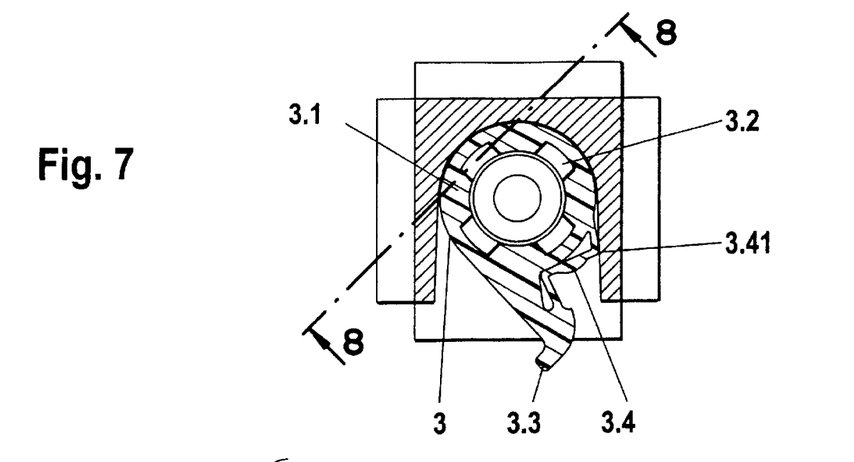
FIG. 7 is a section along the line 8—8 in FIG. 6.
Figure 8:
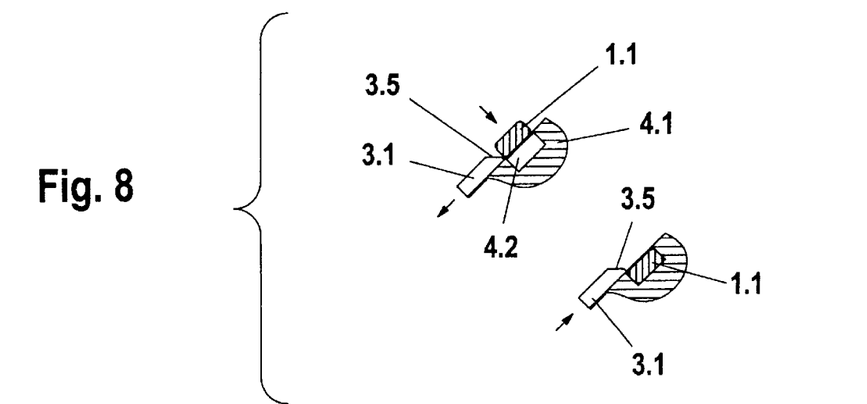
FIG. 8 is a section along the line 8—8 in FIG. 7 during two subsequent stages of snapping together.
Figure 9:
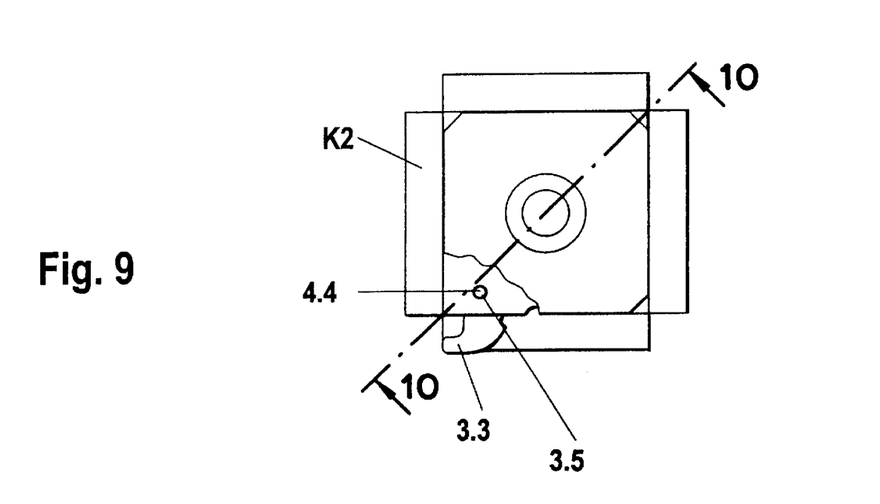
FIG. 9 is a view similar to that in FIG. 1 of the components finally locked together.
Figure 10:
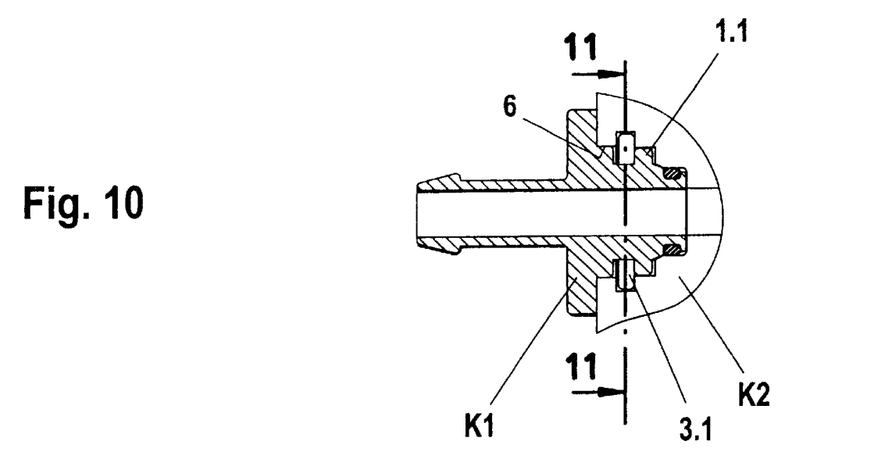
FIG. 10 is a view similar to that in FIG. 2 of the components in the state illustrated in FIG. 9 and is a partial section along line 10—10.
Figure 11:
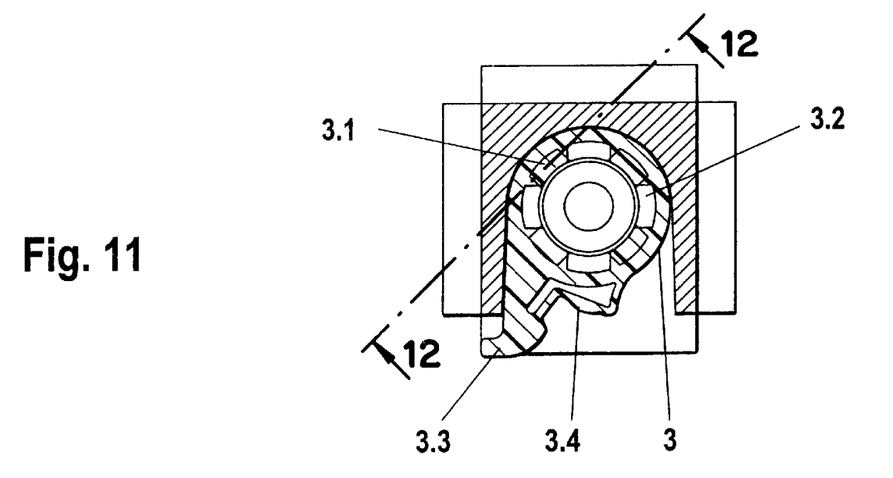
FIG. 11 is a section along the line 11—11 in FIG. 10.
Figure 12:
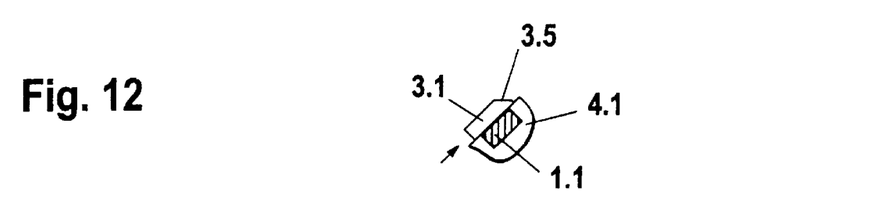
FIG. 12 is a section along the line 12—12 in FIG. 11.
Figures 13, 14:
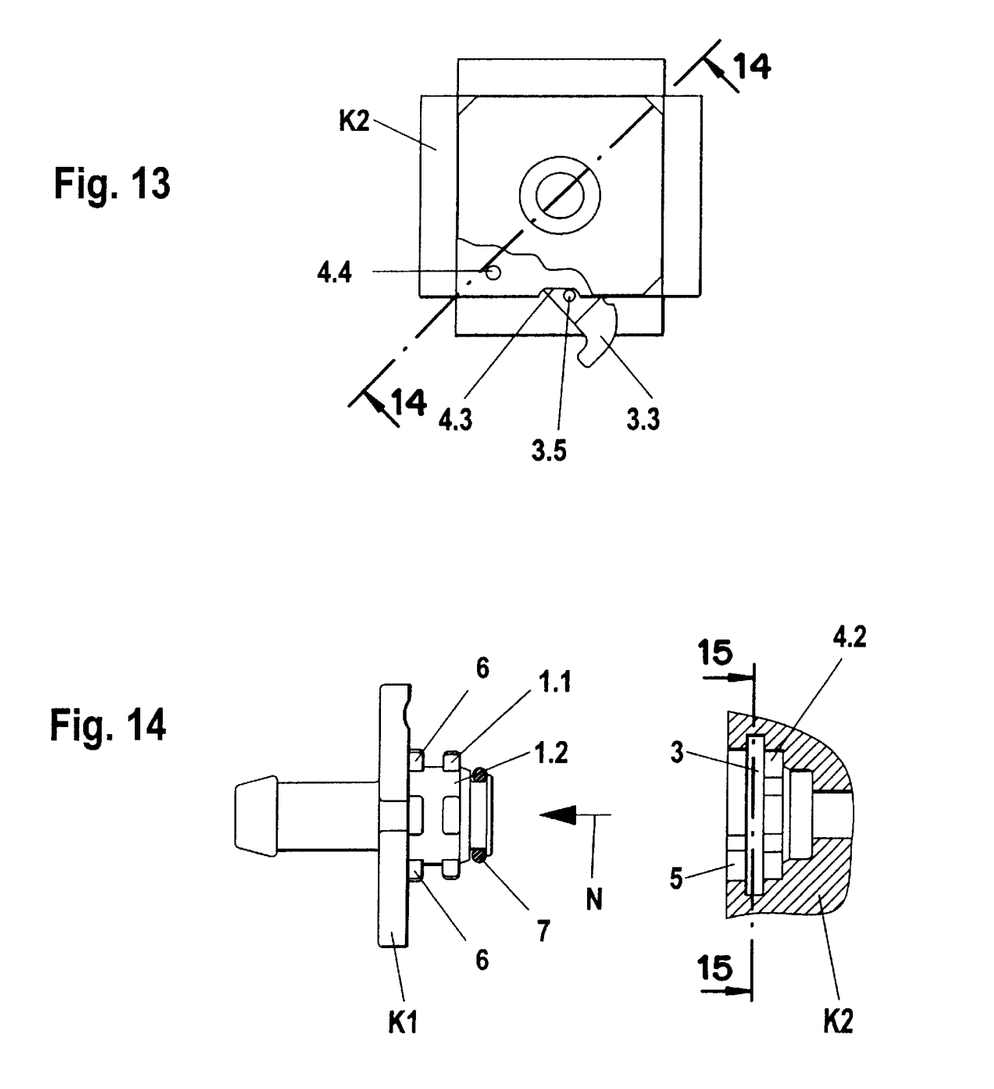
FIG. 13 is a view similar to that in FIG. 1 of the components while the locking mechanism is being unlocked.
FIG. 14 is a view similar to that in FIG. 2 of the components in the state illustrated in FIG. 13 and is a partial section along line 14—14.
Figure 15:
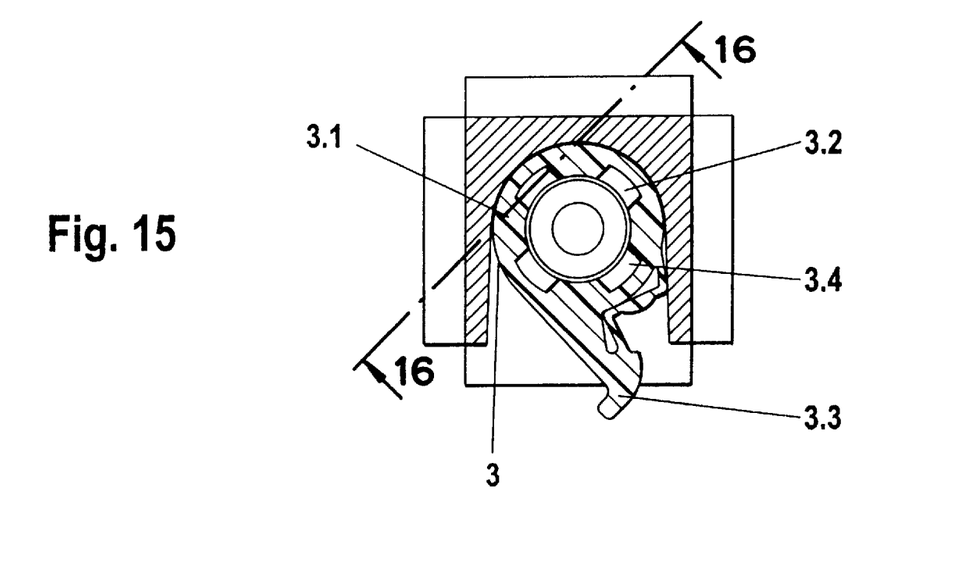
FIG. 15 is a section along the line 15—15 in FIG. 14.
Figure 16:
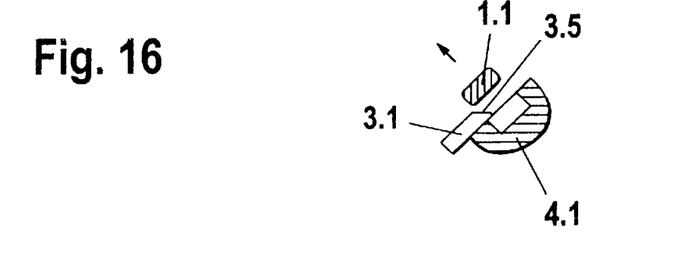
FIG. 16 is a section along the line 16—16 in FIG. 15.

To increase reliability and simplicity in assembling the device, ring 3 is precisely enough dimensioned to ensure, in the assembly position represented in FIGS. 1 through 4 and 5 and 6, that a narrow edgewise section 3.5 (also illustrated in FIGS. 4 and 8) with a bevel paralleling the direction of insertion on each locking segment 3.1 will extend into the path traveled by locking cams 1.1. As male half ST is inserted, accordingly, ring 3 can be rotated back out of the assembly position against the resilience afforded by the material and into a release position around an acute angle (cf. also the detail in FIG. 8). This occurs when male half ST is inserted and locking cams 1.1 encounter the edgewise sections 3.5 on locking segments 3.1 and generate a force on the segments that produces a corresponding torque. Once locking cams 1.1 are through, the resilience by the material will return ring 3 into the assembly position, and the narrow edgewise sections 3.5 will engage behind locking cams 1.1 and temporarily axially secure the connection. It now becomes possible by appropriately rotating the ring with a lever 3.3 either to eliminate this temporary impediment and separate components K1 and K2 or to rotate ring 3 into its final locking position (FIGS. 9–12), with locking segments 3.1 entirely engaging behind locking cams 1.1 (FIG. 12) and ensuring that the device is firmly seated. Ring 3 can be shifted back out of this locking position, into the assembly position, and then on into the release position by appropriately rotating it with lever 3.3, completely unfastening the device and allowing separation of components K1 and K2 in the direction indicated by arrow N (FIG. 14).

The resilience that forces ring 3 out of the release position and into the assembly position is exerted in the illustrated embodiment by a leaf spring 3.4 integrated into the ring, which can be plastic for instance. It is integrated into the outer circumference essentially in the shape of a Z, one end attached to ring 3 and the other to lever 3.3. As ring 3 is rotated out of the assembly position illustrated in FIG. 3 and into the release position illustrated in FIG. 7, spring 3.4 will come to rest against the inner circumference of female half BU, exerting the requisite force. Also provided is a structure that ring 3 snaps into in the locked position illustrated in FIG. 11, that prevents accidental unlocking, and that the ring can be returned out of and into the assembly position by lever 3.3 once a certain level of resistance has been overcome. This snap-in structure comprises a pin 3.5 on lever 3.3 that can slide back and forth in a recess 4.3 in female half BU when the ring is either in the assembly position (FIG. 1) or in the release position (FIG. 5), whereas, when the ring is in the locking position, the pin is secured in s bore 4.4 in female half BU.

Figure 17:
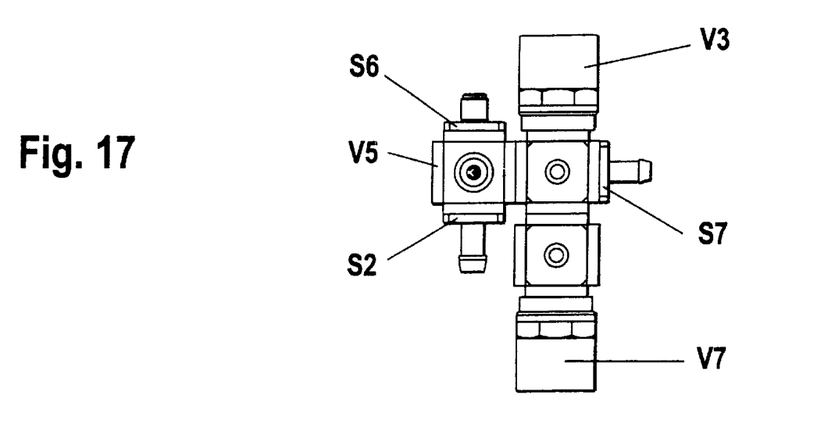
FIG. 17 is a side view of a fitting comprising several components.
Figure 18:
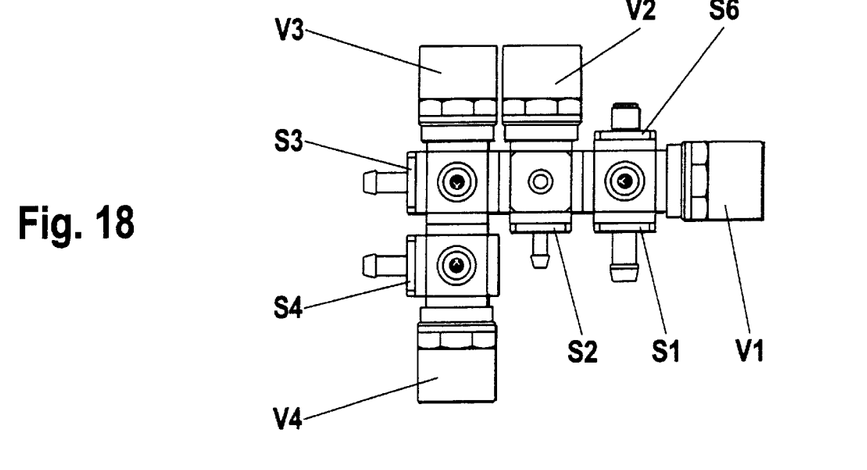
FIG. 18 is a front view of the fitting in FIG. 17.
Figure 19:
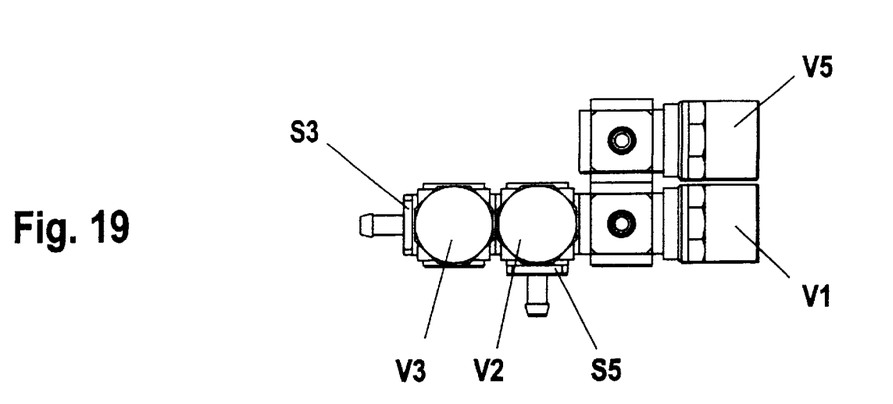
FIG. 19 is a top view of the fitting in FIG. 17.

FIGS. 17 through 19 illustrate various examples of how the locking mechanism specified herein can be employed to interconnect various hydraulic and pneumatic components. In these embodiments, several electromagnetically actuated valves V1 to V5 are combined into a block extending in all three spatial directions and with communicating hose attachments S1 to S7 also extending in three directions. In conventional systems, the assembly and disassembly of such a structure would be extraordinarily complicated. When, on the other hand, these components are interconnected through the locking mechanism illustrated in FIGS. 1 through 16, it will be extremely simple to remove individual components from the block illustrated in FIGS. 17 through 19 and even to remove them from the whole system and insert others. The essentially radial levers in the female halves of these components can easily be accommodated in the gaps between the components and can be shifted out of the assembly position and into the release position or locking position by hand or with a simple tool.

What is claimed is:

1. A device for interconnecting electromagnetically actuated hydraulic or pneumatic valves, each valve having on an outer surface a male or female half of a snap-together connector, the male half being provided with a radial stop that extends into the female half and is secured there by at least one mechanism that locks into place behind the radial stop, a locking ring accommodated in and rotating around a central axis of the female half of the connector and provided with radially inward-projecting locking segments rotated by an outward-extending lever around a prescribed angle out of an assembly position and into a locking position and by stops on the male half of the connector in the form of several radially outward-projecting locking cams distributed at prescribed angles and separated by gaps at least as wide along the circumference as the locking segments, the gaps between the locking segments being at least as wide along the circumference as the locking cams, whereby the male half is inserted into the female half at angles established along the circumference by guides, subsequent to which the locking segments penetrate between the locking cams far enough to come to rest when fully inserted behind the path traveled by the locking segments, which engage the locking cams from behind when the ring is rotated out of the assembly position and into the locking position.

2. The device as in claim 1, further comprising guides in the female half immediately behind the path traveled by the locking segments in the form of radially inward extending ribs that, once the male half has been inserted into the female half, engage the gaps between the locking cams and establish the angle of rotation of the male half along the circumference.

3. The device as in claim 2, further comprising additional guides immediately in front of the path traveled by the locking segments in the female half in the form of radially inward extending ribs distributed along the inner circumference that, once the male half has been inserted, engage gaps between additional cams on the male half, whereby the additional cams are in axial alignment with the locking cams and demarcate space along the circumference for the locking segments to travel through.

4. The device as in claim 1, wherein the locking ring is displaced while in the assembly position such that a narrow edgewise section with a bevel paralleling the direction of insertion on each locking segment extends into the path traveled by the locking cams and the ring can be rotated back around an acute angle against the resilience afforded by the material out of the assembly position and into a release position, wherein the overall design ensures that, when the male half is inserted into the female half, the locking cams will encounter the bevels and the ring will be rotated into the release position by way of the locking segments, whence, once it has traveled past the locking cams, the ring will once again snap into the assembly position, wherein the cams will be engaged from behind by the edgewise sections of the locking segments and temporarily impeded from moving axially, and wherein the impediment can be eliminated by rotating the ring by the lever against the aforesaid resilience out of the assembly position and into the release position.

5. The device as in claim 4, wherein the resilience acting on the locking ring between the assembly position and the release position is exerted by an integrated leaf spring with one end against the outer circumference of the ring and resting against the inner circumference of the female half.

6. The device as in claim 5, wherein the other end of the leaf spring, which is essentially in the shape of a Z, is molded onto the lever.

7. The device as in claim 1, comprising four locking cams in diametrically opposed pairs along the circumference of the male half, the locking ring being provided with four locking segments.

8. The device as in claim 1, wherein the locking ring is secured in the locking position by a snap-in mechanism that can be disengaged.

* * * * *